HUB DRIVER UTILIZING CLAMPING NETWORK AND MEANS TO CONTROLLABLY ISOLATE HUB CIRCUIT FROM CLAMPING NETWORK

Filed Feb. 7, 1963

INVENTOR.
ROBERT A. COUTURIER
BY
OSTROLENK, FABER, GERB & SOFFEN
ATTORNEYS

United States Patent Office 3,194,988

Patented July 13, 1965

3,194,988

HUB DRIVER UTILIZING CLAMPING NETWORK AND MEANS TO CONTROLLABLY ISOLATE HUB CIRCUIT FROM CLAMPING NETWORK

Robert A. Couturier, Stamford, Conn., assignor to Stelma, Incorporated, Stamford, Conn., a corporation of Connecticut Filed Feb. 7, 1963, Ser. No. 256,999

12 Claims. (Cl. 307—88.5)

Figures 1, 1A:
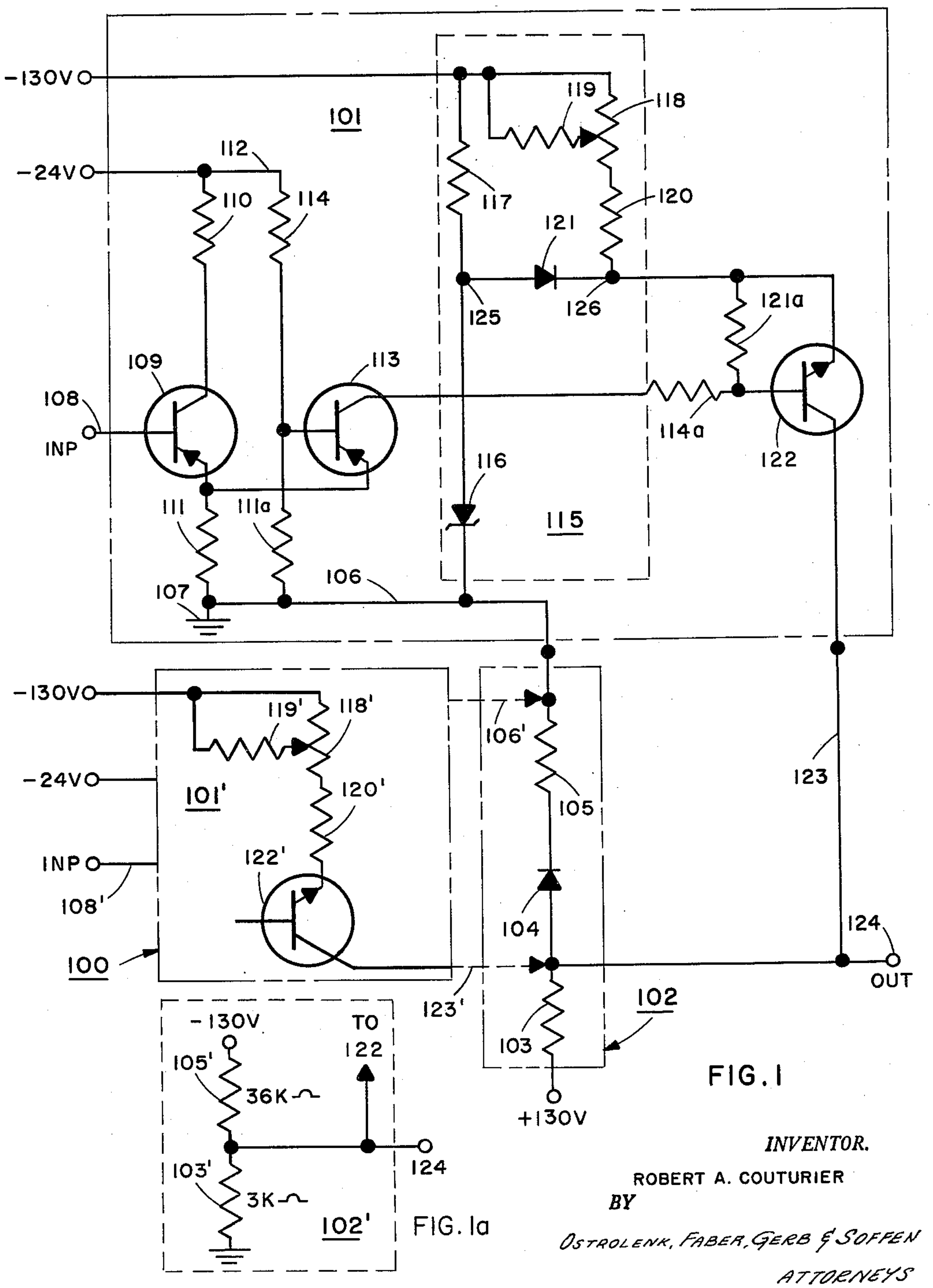

This invention relates to communications systems and more particularly to electronic control circuitry for operating a communications system hub circuit at preselected voltage levels under control of the digital data being received or transmitted, as the case may be.

Many present day communications systems employ digital techniques for the transmission of data. Such digital techniques usually take the form of either mark space transmission or more generally binary transmission. In the first instance, the mark space technique transmits a mark condition or square pulse condition and a space condition or no pulse in order to represent either of two binary states. Binary states may be represented in other ways, such as, for example, utilizing a positive going square pulse for a mark condition and a negative going square pulse for a space condition. In communications systems of this general type, standards have been set for the control voltages employed to drive equipment utilized in such communications systems, such as, for example, transmitters, receivers, lead out devices, such as teletypewriters and so forth. Equipment of the nature described above is operated from a hub or hub circuit which imposes the preset control voltages upon the equipment being operated from the hub circuit. As an example of a typical system, the mark space information is imposed upon the hub circuit which operates at predetermined voltage levels representative of the mark and space conditions respectively, in order to operate a keying circuit which keys suitable oscillator means so as to modulate the oscillator output frequency which modulated signals are suitably amplified and then imposed upon the communications channel. At the same location, received mark space information is suitably demodulated and then imposed upon a hub circuit which is employed to drive either an output device such as a teletypewriter unit, or possibly another transmitter, if the location is employed as a repeater which relays the received data to another remote station. Many other arrangements are possible and the arrangement set forth above being merely exemplary.

The hub has been specified and defined as a voltage divider circuit comprised of three elements, namely, first and second resistors and a diode, which elements are connected in series with the diode positioned between the two resistive elements. The elements of the hub are suitably biased so that the hub generates a positive voltage of predetermined magnitude to represent a mark condition and further generates a negative voltage of predetermined magnitude to represent a space condition. With the rigid standards imposed upon the hub circuitry, it is necessary to design equipment in order to achieve the exact voltages set forth by the standards in order to provide a reliable operative communications system. Such voltage levels must be maintained although the data input to the hub varies, due to drift or other possible noise phenomenon in the equipment.

The instant invention provides a hub driving circuit capable of driving the hub to operate at the standardized positive and negative voltage magnitudes although voltage levels of incoming data to the hub driving circuit may drift or alter during the operation thereof.

The driving circuit of the instant invention is comprised of a comparator means which is employed to receive the input data to control operation of a current generating means. The output of the current generating means is connected to the hub tie-in terminal and when energized drives the hub to the negative voltage level. When the current generating means is deenergized the hub assumes the positive voltage level indicative of a mark condition. A clamping circuit is provided for the purpose of clamping the current generating means to a predetermined negative voltage level throughout its operation. The current generating means is comprised of transistor means having a first terminal connected to the comparator circuit, a second terminal connected to the clamping circuit and a third terminal connected to the hub tie-in point. The arrangement is unique in that the operation of the current generating transistor means is effectively controlled while allowing the three terminals to assume varying values thus avoiding the necessity of tying any of the transistor means terminals to any preset levels thereby permitting an effective operating arrangement. The circuitry described above is extremely advantageous for use in half-duplex systems which systems are described as being capable of transmitting in both directions, but in which only one location transmits at any given time.

The circuitry described above is also found to be extremely advantageous for use in half-duplex systems in which a double space condition is employed for the purpose of terminating transmission. Double space conditions are utilized to drive the hub to a second standardized negative voltage magnitude which is employed for the purpose of indicating the desire to terminate transmission. In such arrangements two hub driving circuits are employed which circuits are connected in parallel to the hub so that when both circuits receive space conditions they drive the hub to a negative voltage level representative of the double space condition. Each of the circuits in parallel in this manner connects the hub tie-in point to an effective clamping network having one-half the impedance of one such hub driving circuit causing the hub tie-in point to assume a negative voltage which is double in magnitude to the single space condition in order to generate a double space condition.

It is therefore one object of the instant invention to provide a novel hub driving circuit for controlling a hub circuit to operate at standardized voltage levels representative of mark and space conditions.

Another object of the instant invention is to provide a novel hub driving circuit for controlling hub circuits to operate at standardized voltage levels of mark and space conditions wherein the hub driving circuit is comprised of current regulating means connected between the hub and a clamping circuit to selectively connect the clamping circuit to the hub tie-in point in order to accurately regulate the mark space voltage levels assumed by the hub circuit.

Another object of the instant invention is to provide a novel hub driving circuit for controlling hub circuits to operate at predetermined voltage levels indicative of mark and space conditions having a novel transistor circuit connected to the hub tie-in point which circuit is effectively controlled even though its space emitter and collector terminals may assume voltage levels of varying values.

Still another object of the instant invention is to provide a novel hub driving circuit for controlling hub circuits to assume predetermined voltage values representative of mark and space conditions wherein a novel clamping circuit is employed to insure that no voltage rating of transistors employed in the circuit will be exceeded.

Still another object of the instant invention is to provide a novel hub driving circuit for controlling hub circuits to operate at predetermined voltage levels representative of mark and space conditions wherein the hub driving circuit employs novel current regulation principles in order to establish the hub voltage levels.

Still another object of the instant invention is to provide a novel hub driving circuit arrangement employing two hub driving circuits for operating a hub circuit, which arrangement successfuly establishes a double space condition to indicate termination of data transmission.

These and other objects of the instant invention will become apparent when considering the accompanying description and drawings in which:

FIGURE 1 is a schematic diagram showing a hub driving circuit designed in accordance with the principles of the instant invention.

FIGURE 1*a* is an alternative embodiment of the hub circuit of FIGURE 1.

Referring now to the drawings, an electronic circuit 100 is shown therein which is comprised of first and second hub driving circuits 101 and 101' respectively, employed for the purpose of operating a hub circuit 102.

The hub circuit 102 is comprised of first and second resistive elements 103 and 105 having a semiconductive element 104 connected therebetween, such that the anode of diode 104 is connected to resistor 103 while the cathode of diode 104 is connected to resistor 105. The other terminal of resistor 103 is connected to a positive voltage level of 130 volts while the opposite terminal of resistor 105 is connected to bus 106 which in turn is connected to ground or reference potential 107. The hub tie-in point [output terminal] 124 is taken from the point between anode of diode 104 and one terminal of resistor 103. According to standards throughout the communications industry which employs such hubs, the output terminal 124 must assume a voltage of plus 60 volts to indicate a mark condition and a voltage of minus 30 volts to indicate a space condition. A voltage of minus 60 volts is employed to indicate a double space condition which will be more fully described.

The hub driving circuit 101, employed for the purpose of controlling hub circuit 102 is comprised of an input terminal 108 for receiving mark and space data. Input terminal 108 is connected to the base of a PNP transistor 109 whose collector electrode is connected to minus 24 volts through a resistor 110 and whose emitter electrode is connected to ground potential 107 through a resistor 111. The emitter electrode of transistor 109 is connected to the emitter electrode of transistor 113 whose base electrode is connected between the common terminal of a voltage divider comprised of resistors 114 and 115 connected between minus 24 volts and ground potential 107 respectively. The transistors 109 and 113 form a voltage comparator for differential amplifier circuit which operates in the following manner:

In order to turn transistor 109 on, a negative voltage of a predetermined magnitude is imposed upon base electrode 108. This causes transistor 109 to become conductive, establishing a voltage drop of a predetermined magnitude across resistor 111. This makes the emitter electrode of transistor 113 negative with respect to ground potential causing transistor 113 to be cut off. In the other operating state, no negative voltage level is imposed upon input terminal 108 causing transistor 109 to be cut off. This causes emitter electrode of transistor 109 to be substantially at ground potential, which condition is likewise imposed upon emitter electrode of transistor 113. The voltage divider circuit comprised of resistors 114 and 115 establishes a negative voltage level on the base electrode of transistor 113 causing transistor 113 to become conductive. The conductive and non-conductive states of transistor 113 are employed for the purpose of controlling transistor 122 in a manner to be more fully described.

Hub driving circuit 101 is further comprised of a clamping network 115 which includes a Zener diode 116 having its cathode terminal connected to ground return bus 106 and having its anode terminal connected to the anode terminal of a diode 121 and one terminal of resistor 117, the opposite terminal of which is connected to a voltage biasing level of minus 130 volts. The cathode electrode of diode 121 is connected to one terminal of the resistor 120 and one terminal of the resistor **121*a*. The other terminal of resistor 120 is connected to one terminal of a variable resistance 118, the opposite terminal of which is connected to the minus 130 volt biasing level. Variable resistor 118 is provided with adjustable arm 119 for adjusting the resistance value of variable resistor 118, for a purpose to be more fully described. Whereas the voltage across the series connected Zener diode 116 and resistor 117 is 130 volts, Zener diode 116 is selected so that a voltage of 62 volts must appear across Zener diode 116 before it becomes conductive. This arrangement thereby clamps terminal 125 to the minus 62 volt level. This likewise clamps the terminal 126 to the minus 62 volt level since, if the terminal 126 attempts to go beneath the minus 62 volt level, diode 121 will conduct in order to clamp terminal 126 through effectively the same voltage level as terminal 125**.

As previously mentioned, terminal 126 is connected to one terminal of a resistor **121*a*, the other terminal of which is connected to the base electrode of transistor 122. Terminal 126 is also directly connected to the emitter electrode of transistor 122. The base electrode of transistor 122 is likewise connected to the collector electrode of transistor 113 by means of a resistor 114a. The collector electrode of transistor 122 is connected by means of conductor 123 to the hub output terminal 124**.

The operation of the hub driving circuit is as follows: The imposition of a negative voltage upon the input terminal 108, and hence base electrode of transistor 109, causes transistor 109 to conduct and transistor 113 to be cut off in the manner previously described. In this condition, no current flows in the collector circuit comprised of resistors **114*a*, 121*a*, 120 and 118. Due to the presence of zener diode 116, the collector electrode of transistor 113 is clamped at the minus 62 volt level. Since the collector current for transistor 113 is zero, no current is delivered to the base electrode of transistor 122. Thus, transistor 122 remains in the cut off state with its collector remaining at the plus 60 volt level, while its emitter electrode is at the minus 62 volt level. The plus 60 volt level at the collector electrode of transistor 122 is established by the series current path comprised of the plus 130 volt biasing potential, resistor 103, forwardly conducting diode 104 and resistor 105 which is connected to ground return bus 106. The resistive values of resistors 103 and 105 were selected so that output terminal 124 is at plus 60 volts. Thus, with the collector electrode of transistor 122 being at the plus 60 volt level, while its emitter is at the minus 62 volt level, the collector to emitter voltage does not exceed 122 volts. With this arrangement the power zener diode 116 dissipates its maximum power since it furnishes maximum current to the clamping network 115**.

When no voltage is impressed upon the input terminal 108 indicative of a space condition, this causes transistor 109 to be cut off causing transistor 113 to become conductive in the manner as previously described. Under this condition, the collector circuit of transistor 113 has a collector current which flows through resistor **114*a* and divides itself between the base electrode of transistor 122 and resistive element 121*a*. Current flow into transistor 122 causes transistor 122 to be turned on, establishing a conductive path from the plus 130 volt biasing potential through resistor 103, conductor 123, transistor 122, resistor 120 and variable resistance 118, to the minus 130 volt biasing potential. The resistive value of resistor 118 is established so that a voltage drop across resistors 118 and 120 of minus 100 volts is established causing terminal 126** to be at voltage level of minus 30 volts.

This causes diode 121 to be back-biased, enabling terminal 126 to remain at the level of minus 30 volts. Transistor 122 has substantially no voltage drop between its collector and emitter terminals so that the hub tie-in or output terminal 124 is at the minus 30 volt level. The reverse biasing of clamping diode 121 causes zener diode 116 to stop delivering current to the resistive elements 120 and 118 of the clamping network. The exact value of minus 30 volts of the hub is determined by the adjustment of the variable resistance 118 in the clamping network 115. It can be seen from a consideration of the description of operation of the hub driving circuit, that the emitter, base and collector electrodes of transistor 122 are not tied to any voltage biasing levels during the operation thereof. In spite of this arrangement, however, the transistor 122 may nevertheless be controlled effectively to very accurately regulate the mark and space voltage conditions of the hub tie-in point 124. The hub tie-in point 124 may be connected to any suitable utilization means, such as, for example, a teletypewriter output device, a mark space transmitter, or any other suitable communications equipment normally driven by a hub circuit.

In applications where it is desirable to provide a double space condition to indicate a termination of transmission, two hub driving circuits 101 and 101′ are employed. The second hub driving circuit 101′ is connected in a manner identical to that of hub driving circuit 101 relative to the hub circuit 102. Thus, the conductor 123′ of hub driving circuit 101′ is connected to the hub tie-in point 124, while the ground return bus 106′ of hub driving circuit 101′ is connected to the ground return bus 105 of hub driving circuit 101. It should be noted that like numerals designate like elements, as between the hub driving circuits 101 and 101′.

One manner in which a double space condition is generated is that of employing two communication channels one of which is connected to input terminal 108 while the other is connected to input terminal 108′ of hub driving circuits 101 and 101′ respectively. Space conditions are then imposed upon both input terminals 108 and 108′ causing the comparator circuits of both hub driving circuits to inject current into the transistor control means 122 and 122′. Under these conditions, two impedance circuits are connected in parallel to the hub tie-in point 124. The first circuit is comprised of conductor 123, transistor 122, resistor 120 and resistor 118, connected to a minus 130 volt potential, all of which elements are contained in hub driving circuit 101. The second parallel circuit is comprised of conductor 123′, transistor 122′, resistor 120′ and variable resistor 118′, which is connected to a minus 130 volt biasing potential. It should be noted that only a portion of the hub driving circuit 101′ has been reproduced in the figure, for purposes of clarity. Thus, the two paths established upon receipt of the double-space condition cause an effective impedance of one-half the impedance values of elements 118 and 120, to be connected between hub tie-in point 124 and the minus 130 volt potential. Thus the voltage drop across the resultant impedance is one-half that of the original voltage drop causing the hub tie-in point 124 to be at a level of minus 60 volts, which is indicative of the double space condition. In this condition the hub currents are equally divided between the two transistors 122 and 122′ while the clamping diodes, such as the clamping diode 121 of driving circuit 101 still remain cut off and the zener diodes, such as the zener diode 116, do not deliver current to the clamping network.

In many applications it is possible to use a hub circuit such as the hub circuit 102′, shown in FIGURE 1*a* of the drawings, which hub circuit omits the use of a diode in the hub. The hub circuit 102′ is comprised of series connected resistive elements 103′ and 105′ having their common terminal connected to the hub tie-in point 124′. With such a hub circuit, the opposite terminal of resistor 103′ is connected to ground potential while the opposite terminal of resistive element 105′ is connected to minus 130 volts. The resistive values of resistors 103′ and 105′ are selected so that a mark condition is represented by minus 10 volts and a space condition is represented by minus 60 volts. This hub circuit may be substituted for the hub circuit 102′, shown in FIGURE 1, without necessitating any changes in the hub driving circuits 101 or 101′. Hub circuits of this general type are employed in full duplex systems which are defined as systems in which both connected locations may transmit and receive simultaneously therethrough.

It can therefore be seen that the instant invention provides a novel hub driving circuit which utilizes a current principle for controlling the voltage levels of the hub-tie-in point. The transistor employed for regulating the voltage levels of the hub tie-in point is unique in that it operates very effectively although the voltages at its electrodes may vary throughout the operation thereof. Use of two such hub driving circuits has been shown to give very effective results for the purpose of providing a double space condition in order to terminate transmission.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition.

2. Means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current conditions, said second means comprising transistor means having an emitter electrode connected to said clamping means and a base electrode connected to the output of said first means, the collector electrode of said transistor means being connected to the hub circuit.

3. Means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means, said clamping circuit comprising a Zener diode means for clamping said second means second input terminal at a predetermined voltage level; the polarity of said clamping means enabling said second input terminal to operate above said predetermined voltage level.

4. Means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means, said clamping circuit comprising a zener diode means for clamping said second means second input terminal at a predetermined voltage level; said clamping means enabling said second input terminal to operate above said predetermined voltage level, impedance means having a first terminal connected to said zener diode means and a second terminal connected to said emitter electrode for controlling the operating voltage levels of the hub circuit.

5. Means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said first means comprising a differential amplifier.

6. In a hub circuit comprising series connected impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means, said clamping circuit comprising a zener diode means for clamping said second means second input terminal at a predetermined voltage level; said clamping means enabling said second input terminal to operate above said predetermined voltage level, impedance means having a first terminal connected to said zener diode means and said emitter electrode for controlling the operating voltage levels of the hub circuit.

7. In a hub circuit comprising series connected impedance elements and diode means connected between said impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means.

8. In a hub circuit comprising series connected impedance elements and diode means connected between said impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means, the collector electrode of said transistor means being connected to the common terminal of the hub circuit impedance means.

9. In a hub circuit comprising series connected impedance elements and diode means connected between said impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said clamping circuit comprising a zener diode means for clamping said second means second input terminal at a predetermined voltage level; said clamping means enabling said second input terminal to operate above said predetermined voltage level.

10. In a hub circuit comprising series connected impedance elements and diode means connected between said impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means, said clamping circuit comprising a zener diode means for clamping said second means second input terminal at a predetermined voltage level; said clamping means enabling said second input terminal to operate above said predetermined voltage level.

11. In a hub circuit comprising series connected impedance elements and diode means connected between said impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said second means comprising transistor means having an emitter electrode connected to said clamping means and a base electrode connected to the output of said first means, said clamping circuit comprising a zener diode means for clamping said second means second input terminal at a predetermined voltage level; said clamping means enabling said second input terminal to operate above said predetermined voltage level, impedance means having a first terminal connected to said zener diode means and said emitter electrode for controlling the operating voltage levels of the hub circuit.

12. In a hub circuit comprising series connected impedance elements and diode means connected between said impedance elements, means for driving a hub circuit comprising first means for receiving digital information in the form of mark and space signals; said first means selectively generating current and no current conditions at its output responsive to said mark and space signals; clamping means; second means having a first input terminal connected to the output of said first means and a second input terminal connected to said clamping means; said second means electrically connecting said clamping means to the hub circuit responsive to said current condition and isolating the hub circuit from said clamping means responsive to said no current condition, said first means comprising a differential amplifier.

References Cited by the Examiner

UNITED STATES PATENTS 3,019,351 1/62 Pormerene et al. ------ 307—88.5

ARTHUR GAUSS, *Primary Examiner.*